(12) United States Patent
Raz

(10) Patent No.: US 8,595,465 B1
(45) Date of Patent: Nov. 26, 2013

(54) VIRTUAL ADDRESS TO PHYSICAL ADDRESS TRANSLATION USING PREDICTION LOGIC

(75) Inventor: Moshe Raz, Rishon Lezion (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 291 days.

(21) Appl. No.: 12/877,788

(22) Filed: Sep. 8, 2010

Related U.S. Application Data

(60) Provisional application No. 61/240,939, filed on Sep. 9, 2009, provisional application No. 61/253,760, filed on Oct. 21, 2009.

(51) Int. Cl.
  *G06F 12/00* (2006.01)
  *G06F 9/26* (2006.01)
  *G06F 9/34* (2006.01)

(52) U.S. Cl.
  USPC ........... 711/208; 711/200; 711/202; 711/203; 711/204; 711/205; 711/206; 711/207; 711/211; 711/213; 711/217; 711/220; 711/221

(58) Field of Classification Search
  USPC .................................................. 711/200–221
  See application file for complete search history.

(56) References Cited

U.S. PATENT DOCUMENTS

| | | | | |
|---|---|---|---|---|
| 5,611,065 A | * | 3/1997 | Alferness et al. | 711/220 |
| 6,686,920 B1 | * | 2/2004 | Peck et al. | 345/557 |
| 6,851,038 B1 | * | 2/2005 | Krolski et al. | 711/207 |
| 2002/0144078 A1 | * | 10/2002 | Topham et al. | 711/203 |

\* cited by examiner

*Primary Examiner* — Matthew Bradley
*Assistant Examiner* — Rocio Del Mar Perez-Velez

(57) ABSTRACT

Some of the embodiments of the present disclosure provide a method for predicting, for a first virtual address, a first descriptor based at least in part on the one or more past descriptors associated with one or more past virtual addresses; and determining, for the first virtual address, a first physical address based at least in part on the predicted first descriptor. Other embodiments are also described and claimed.

21 Claims, 4 Drawing Sheets

VIRTUAL ADDRESS TO PHYSICAL ADDRESS TRANSLATION USING PREDICTION LOGIC

CROSS REFERENCE TO RELATED APPLICATIONS

The present application claims priority to U.S. Patent Application No. 61/240, 939, filed Sep. 9, 2009, and to U.S. Patent Application No. 61/253,760, filed Oct. 21, 2009, the entire specifications of which are hereby incorporated by reference in their entirety for all purposes, except for those sections, if any, that are inconsistent with this specification.

TECHNICAL FIELD

Embodiments of the present disclosure relate to virtual address to physical address translation in general, and more specifically, to virtual address to physical address translation using prediction logic.

BACKGROUND

Unless otherwise indicated herein, the approaches described in this section are not prior art to the claims in the present disclosure and are not admitted to be prior art by inclusion in this section.

In a computing system, a processing core associated with a virtual memory system outputs a virtual memory address (also referred to herein as virtual address) on a logical memory space when the processing core has to access instruction and/or data. However, the actual instruction and/or data are stored at a physical memory address (also referred to herein as physical address) on a physical space (e.g., on any appropriate storage unit). Therefore, the virtual address has to be translated to the corresponding physical address, before accessing the physical space. In various computer systems, a translation look-aside buffer (TLB), which stores mapping from virtual addresses to physical addresses, is used for the translation.

SUMMARY

In various embodiments, the present disclosure provides a method for operating a translation module, the method comprising predicting, for a first virtual address, a first descriptor based at least in part on the one or more past descriptors associated with one or more past virtual addresses; and determining, for the first virtual address, a first physical address based at least in part on the predicted first descriptor. There is also provided a system-on-chip (SOC) comprising one or more processing cores; and a virtual address to physical address translation module comprising a prediction module configured to predict, for a first virtual address, a first descriptor based at least in part on the one or more past descriptors associated with one or more past virtual addresses; and a multiplexing module configured to determine, for the first virtual address, a first physical address based at least in part on the predicted first descriptor. There is also provided a virtual address to physical address translation module comprising a prediction module configured to obtain one or more past descriptors associated with one or more past virtual addresses, and predict, for a first virtual address, a first descriptor based at least in part on the one or more past descriptors; and a prediction verification module configured to verify a correctness of predicting the first descriptor.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure. It is to be understood that other embodiments may be utilized and structural or logical changes may be made without departing from the scope of the present disclosure. Therefore, the following detailed description is not to be taken in a limiting sense, and the scope of embodiments in accordance with the present disclosure is defined by the appended claims and their equivalents.

DETAILED DESCRIPTION

Figure 1:
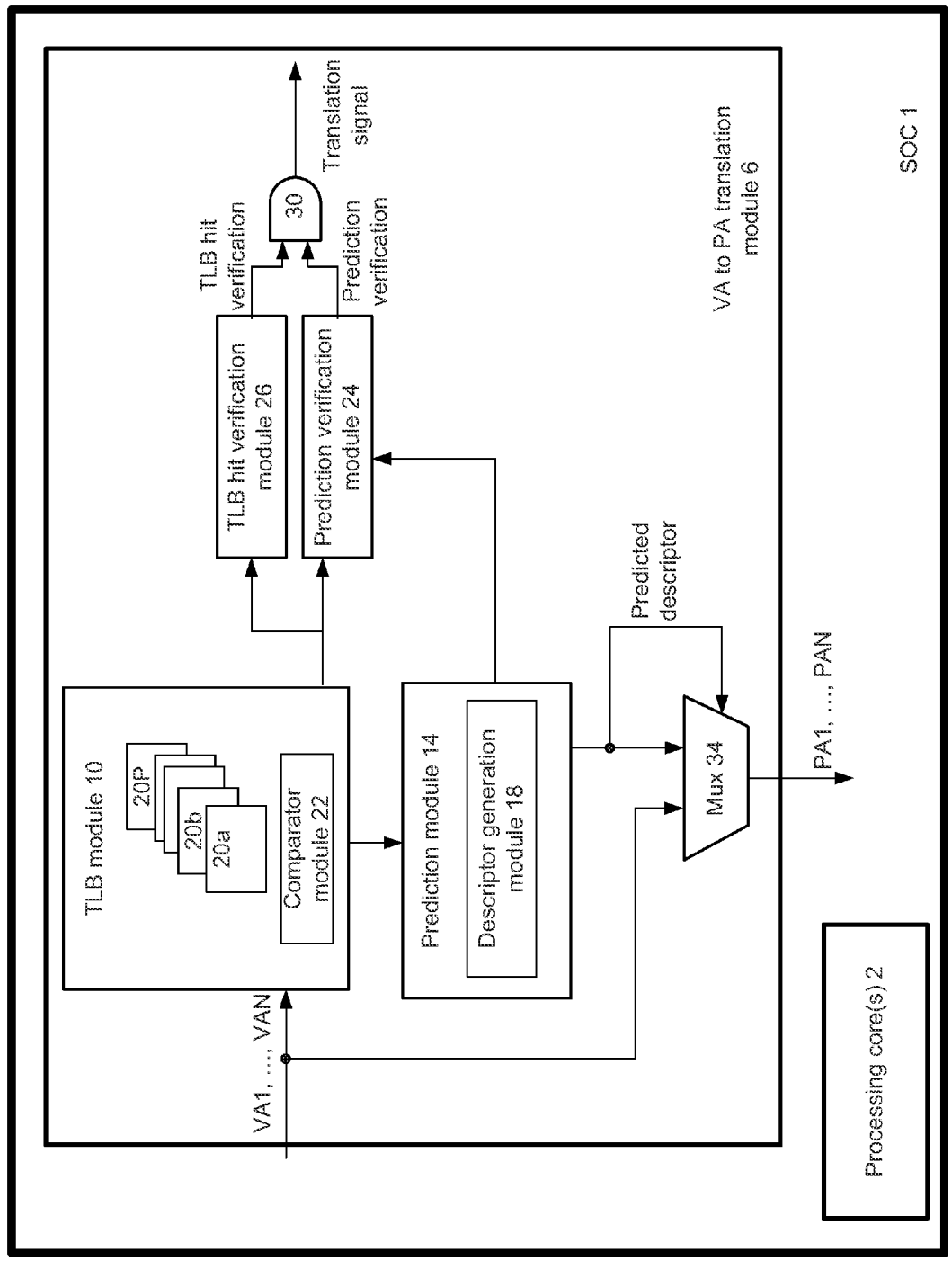
FIG. 1 schematically illustrates a system-on-chip (SOC) that includes a virtual address to physical address translation module (also referred to herein as a translation module), in accordance with an embodiment of the present disclosure.

FIG. 1 schematically illustrates a system-on-chip (SOC) 1 that includes a virtual address (VA) to physical address (PA) translation module 6 (also referred to herein as translation module 6), in accordance with an embodiment of the present disclosure. The SOC 1 also includes one or more processing cores, illustrated as processing core(s) 2 in FIG. 1. Although the SOC 1 includes several other components (e.g., a communication bus, one or more peripherals, interfaces, and/or the like), these components are not illustrated in FIG. 1 for the purpose of maintaining illustrative clarity.

In an embodiment, the translation module 6 receives a series of virtual addresses VA1, ..., VAN, and translates the series of virtual addresses to a corresponding series of physical addresses PA1, ..., PAN, where N is an appropriate integer. In an embodiment, the translation module 6 receives one or more of the series of virtual addresses VA1, ..., VAN from the processing core(s) 2. In another embodiment, the translation module 6 receives one or more of the series of virtual addresses VA1, ..., VAN from any other appropriate component either included in, or external to the SOC 1 (e.g., from a processing core that is external to the SOC 1). In another example, the translation module 6 receives one or more of the series of virtual addresses VA1, ..., VAN from the processing core(s) 2, and another one or more of the series of virtual addresses VA1, ..., VAN from the processing core that is external to the SOC.

The virtual addresses VA1, ..., VAN are received sequentially. That is, virtual address VA2 is received subsequent to receiving VA1, VAi is received subsequent to receiving VA(i−1), VAN is received subsequent to receiving VA(N−1), and so on. Although only virtual addresses VA1, ..., VAN are illustrated to be received by the translation module 6, one or more virtual addresses may be received prior to receiving virtual address VA1, one or more virtual addresses may be received subsequent to receiving virtual address VAN, and/or one or more virtual addresses may be interleaved in between the virtual addresses VA1, ..., VAN. For example, in an embodiment, one or more virtual addresses are received in between receiving virtual addresses VA1 and VA2.

For the purpose of the present disclosure and unless otherwise disclosed, while translating a virtual address VAi to a corresponding physical address PAi, the virtual address VAi is referred to as a current virtual address; and one or more virtual addresses (e.g., VA0, . . . , VA(i−1)), which are received prior to receiving the current virtual addresses VAi, are referred to as past virtual addresses.

The translation module 6 includes a translation look-aside buffer (TLB) module 10, which receives the series of virtual addresses VA1, . . . , VAN. The TLB module 10 includes a plurality of TLB entries 20a, 20b, . . . , 20P, where P is an appropriate integer. In an embodiment, each virtual address is associated with a corresponding descriptor and a corresponding physical address. For example, a physical address can be constructed from the corresponding virtual address and the corresponding descriptor. The plurality of TLB entries 20a, . . . , 20P stores mapping between virtual addresses and associated descriptors. For example, TLB entry 20a stores mapping between at least one virtual address and a corresponding descriptor. In an embodiment, the TLB entries 20a, . . . , 20P are implemented as content-addressable memory (CAM), although in another embodiment, the TLB entries 20a, . . . , 20P are implemented using any other appropriate manner.

The TLB module 10 also includes a comparator module 22. The comparator module 22 compares a received virtual address with virtual addresses stored in the TLB entries 20a, . . . , 20P. The received virtual address matching with a virtual address stored in any one of the TLB entries 20a, . . . , 20P results in a TLB hit. On the other hand, the received virtual address not matching with any of the virtual addresses stored in the TLB entries 20a, . . . , 20P results in a TLB miss. In the case of a TLB hit, the TLB module 10 outputs an associated descriptor to a prediction module 14 included in the translation module 6. In the case of a TLB miss, the correct descriptor corresponding to the current virtual address is fetched from an external TLB module and/or from any other appropriate external database (e.g., external to the translation module 6 and possibly external to the SOC 1, not illustrated in FIG. 1).

In an embodiment, making the TLB module 10 relatively large (e.g., by introducing relatively more TLB entries) results in relatively more TLB hits (i.e., relatively fewer TLB misses), but generally increases associated hardware cost. Selecting a size of the TLB module 10 is a design choice which is based, for example, at least in part on several factors like an application area and/or criticality of the SOC 1, an associated cost factor, etc.

The translation module 6 also includes the prediction module 14, which comprises a descriptor generation module 18. In an embodiment, the translation module 6 receives a first virtual address (e.g., VAi, which is the current virtual address) and one or more additional virtual addresses (e.g., VA0, . . . , VA(i−1), which are past virtual addresses), where the one or more additional virtual addresses are received prior to receiving the first virtual address. While the translation module 6 receives the first VA, the prediction module 14 is aware of descriptors associated with the one or more additional virtual addresses. The prediction module 14 predicts a first descriptor associated with the first virtual address, based at least in part on the prediction module 14 being aware of the one or more descriptors associated with the one or more additional virtual addresses. That is, based on descriptors associated with past virtual addresses, the prediction module 14 predicts a descriptor of a current virtual address, as will be discussed further in more detail herein. The descriptor generation module 18 generates a copy or a clone of the descriptor that is predicted by the prediction module 14.

In an embodiment and as illustrated in FIG. 1, the prediction of a descriptor of a current virtual address, as predicted by the prediction module 14, is based on descriptors of past virtual addresses, where the prediction module 14 receives the descriptors of the past virtual addresses from the TLB module 10 and/or predicts the descriptors of the past virtual addresses. In an embodiment, the prediction module 14, however, does not receive the current virtual address, i.e., the prediction performed by the prediction module 14 is not based on the current virtual address. On the other hand, the determination of a descriptor corresponding to the current virtual address, by the TLB module 10 (e.g., using the comparator module 22), is based on a comparison of the current virtual address and virtual addresses stored in the TLB entries 20a, . . . , 20P.

The translation module 6 also includes a multiplexer 34 (illustrated as Mux 34 in FIG. 1). The multiplexer 34 receives a current virtual address and also receives a corresponding descriptor of the current virtual address (where the corresponding descriptor is predicted by the prediction module 14 and generated by the descriptor generation module 18). Based at least in part on receiving the current virtual address and the associated predicted descriptor, the multiplexer 34 generates the corresponding physical address. In an embodiment, the physical address is generated by multiplexing one or more bits of the received virtual address and one or more bits of the predicted descriptor, based at least in part on one or more bits of the predicted descriptor. Such generation of a physical address, from corresponding virtual address and descriptor, is based on, for example, a structure or type of the physical address, the virtual address and/or the descriptor. Thus, based on receiving a series of virtual addresses VA1, . . . , VAN and receiving corresponding predicted descriptors from the prediction module 14, the multiplexer 34 generates the corresponding series of physical addresses PA1, . . . , PAN. The physical addresses PA1, . . . , PAN generated by the translation module 6, in response to receiving the virtual addresses VA1, . . . , VAN, can be used for a variety of purposes, some of which will be discussed herein later.

In an embodiment, for one or more virtual addresses (e.g., VAj), the multiplexer 34 may be unable to generate a corresponding physical address PAj due to, for example, a wrong prediction (or no prediction at all) by the prediction module 14, and/or if a descriptor of the virtual address is not stored in the TLB module 10. Thus, although FIG. 1 illustrates generating the series of physical addresses PA1, . . . , PAN corresponding to the series of virtual addresses VA1, . . . , VAN, one or more physical addresses (e.g., PAj) may not be included in the series of physical addresses PA1, . . . , PAN. In another embodiment, the multiplexer 34 generates a physical address PAj of a descriptor, which was incorrectly predicted by the prediction module 14, using a descriptor generated by the TLB module 10 or using a descriptor received from a TLB module (not illustrated in FIG. 1) that is external to the translation module 6 (e.g., if the associated virtual address is a TLB miss).

The translation module 6 also includes a prediction verification module 24. The prediction verification module 24 is configured to verify whether the prediction of the descriptor, performed by the prediction module 14, is correct. The prediction verification module 24 outputs a prediction verification signal, which is indicative of whether the prediction is correct or not. In an embodiment, the prediction verification signal is a single bit signal, which, for example, is high (e.g., higher than a threshold value, representing a logical one value) if the prediction of a descriptor corresponding to a current virtual address is incorrect, and is low (e.g., lower than a threshold value, representing a logical zero value) if the prediction of the descriptor corresponding to the current virtual address is correct. While the prediction module 14 is included in a critical path for generating the physical address, the prediction verification module 24 is not necessarily included in such a critical path. That is, operation of the prediction verification module 24 does not affect generation of a descriptor by the prediction module 14 (and thus, does not directly affect generation of a physical address by the translation module 6). Rather, the prediction verification module 24 verifies whether the generated descriptor is correct or not.

The translation module 6 also includes a TLB hit verification module 26, which outputs a TLB hit verification signal. The TLB hit verification module 26 is configured to verify whether a mapping of a current virtual address, received by the translation module 6, is stored in the TLB entries 20a, ..., 20P (i.e., whether the current virtual address is a TLB hit or a TLB miss). In an embodiment, the TLB hit verification signal is a single bit signal. For example, if the current virtual address is a hit (i.e., if the mapping of the virtual address is stored in one of the TLB entries 20a, ..., 20P), the TLB hit verification signal is high; and if the virtual address is a miss (i.e., if the mapping of the virtual address is not stored in any one of the TLB entries 20a, ..., 20P), the TLB hit verification signal is low.

The translation module 6 also includes a logical AND gate 30. The AND gate 30 receives the TLB hit verification signal and the prediction verification signal, and outputs a translation signal through a logical AND operation. The translation signal indicates a success or failure of the translation operation of the virtual address, as will be discussed in more detail herein later.

Figure 2:
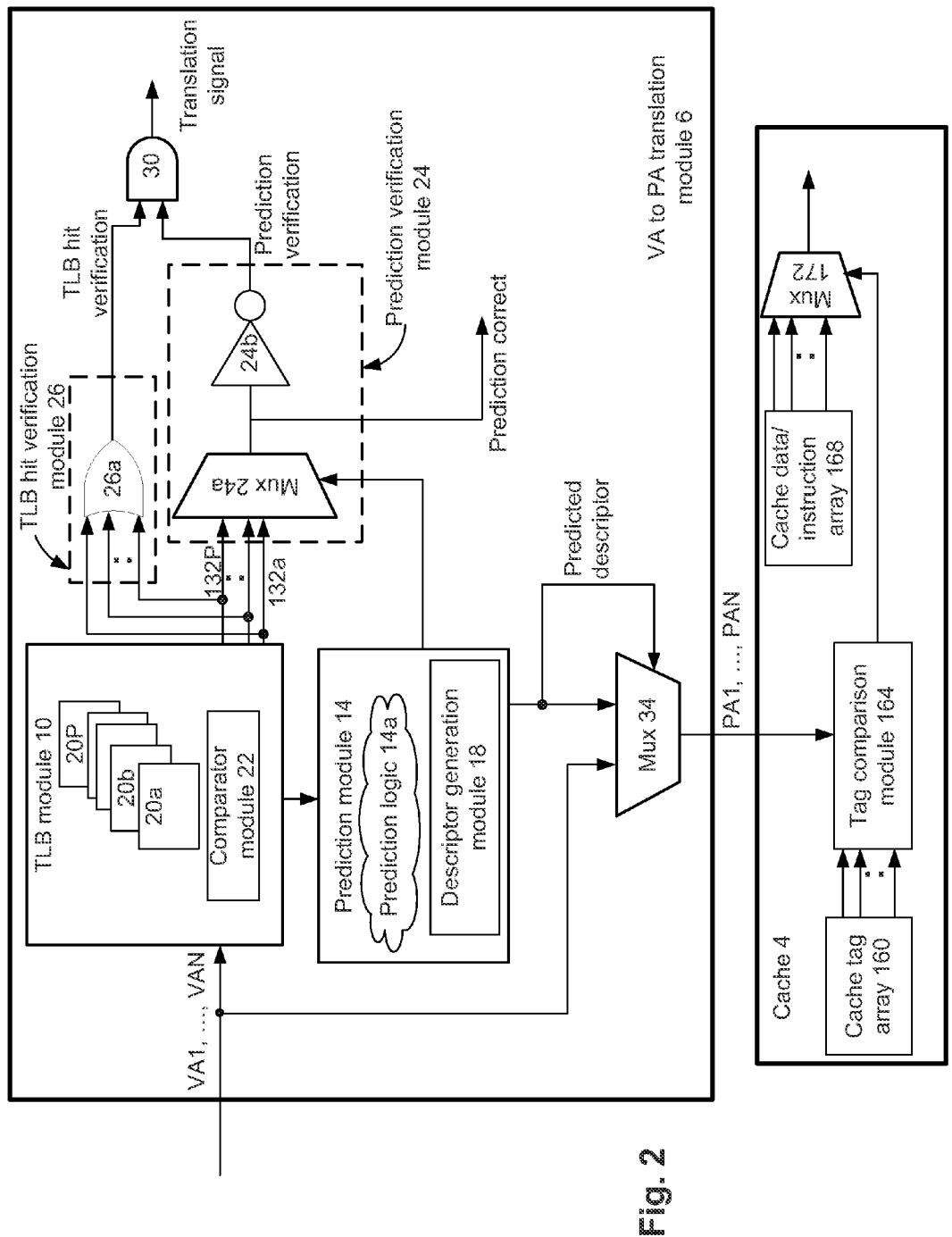
FIG. 2 schematically illustrates the translation module of FIG. 1 in more detail, in accordance with an embodiment of the present disclosure.

FIG. 2 schematically illustrates the translation module 6 of FIG. 1 in more detail, in accordance with an embodiment of the present disclosure. In an embodiment, the prediction module 14 includes prediction logic 14a that is configured to access one or more past descriptors associated with one or more past virtual addresses; and predict, for a first virtual address, a first descriptor based at least in part on the one or more past descriptors. In an embodiment, the prediction logic 14a is configured to observe and analyze a pattern in past descriptors, and configured to predict a descriptor for a current virtual address based at least in part on the pattern.

Referring to FIGS. 1 and 2, in an embodiment, in response to receiving and comparing the current virtual address with virtual addresses stored in TLB entries 20a, ..., 20P, the TLB module 10 outputs, to the prediction verification module 24 and to the TLB hit verification module 26, P number of signals 132a, ..., 132P, where P is an integer. Each signal of the P signals 132a, ..., 132P is a single bit signal and corresponds to a respective TLB entry of the TLB entries 20a, ..., 20P. In an embodiment, each of the P signals indicates whether the current virtual address matches with a virtual address stored in a corresponding TLB. For example, if the current virtual address VAi matches with a virtual address stored in TLB entry 20b, then signal 132b is set to high and the remaining signals of the P signals 132a, ..., 132P are set to low. Thus, for the virtual address VAi, one of the P signals 132a, ..., 132P being high and the rest being low indicate that the virtual address VAi matches with a virtual address stored in one of the TLB entries, and that the virtual address VAi is a hit in the TLB module 10. On the other hand, for the received virtual address VAi, all the P signals 132a, ..., 132P being low indicates that the virtual address VAi does not match with any of the virtual addresses stored in the TLB entries 20a, ..., 20P, and that the virtual address VAi is a miss in the TLB module 10.

FIG. 2 also illustrates an example configuration of the prediction verification module 24 and the TLB hit verification module 26. In an embodiment, the TLB hit verification module 26 comprises a logical OR gate 26a, which performs a logical OR operation on the P signals 132a, ..., 132P to output the TLB hit verification signal. The TLB hit verification signal is high if a virtual address is a hit in the TLB module 10, and low if the virtual address is a miss in the TLB module 10, as previously discussed.

The prediction verification module 24 includes a multiplexer 24a (labeled as Mux 24a in FIG. 2) and an inverter 24b. The multiplexer 24a selectively outputs one of the P signals 132a, ..., 132P, based at least in part on an output of the prediction module 14. For example, for a current virtual address VAi, if the prediction module 14 predicts a descriptor corresponding to a virtual address VAm that is stored in the TLB entry 20m, the multiplexer 24a selects and outputs the signal 132m based on the output of the predictor module 14. For the prediction of the prediction module 14 to be correct, the received virtual address VAi has to match with the virtual address VAm stored in the TLB entry 20m. That is, for the prediction to be correct, signal 132m has to be high and the remaining signals of the P signals 132a, ..., 132P has to be low. As the multiplexer 24a outputs the signal 132m, the prediction by the prediction module 14 is correct if the output of the multiplexer 24a is high, and is incorrect if the output of the multiplexer 24a is low. The output of the multiplexer is labeled as prediction correct signal. Thus, the prediction is correct if the prediction correct signal is high, and incorrect otherwise. The output of the multiplexer 24b is inverted by the inverter 24b, which outputs the prediction verification signal. The prediction verification signal is high if the prediction corresponding to a current virtual address is incorrect, and low otherwise (i.e., the prediction verification signal is an inverse of the prediction correct signal).

As previously discussed, the AND gate 30 receives the TLB hit verification signal and the prediction verification signal, and outputs the translation signal through a logical AND operation. In an embodiment, the translation signal is high if (i) the current virtual address is a TLB hit, and (ii) if the prediction of the corresponding descriptor, by the prediction module 14, is incorrect. The translation signal is low otherwise.

By predicting the descriptor of the current virtual address (e.g., instead of generating the descriptor based on matching the current virtual address with the TLB entries 20a, ..., 20P), the translation module 6 improves on a total time (e.g., total number of cycles, total number of Pico-seconds, etc.) taken by the translation module 6 to translate a current virtual address to a corresponding physical address. For example, a conventional translation module, which lacks at least the prediction module 14 (e.g., in which virtual address translation is fully deterministic and is performed solely by a TLB module), may take two or more clock cycles (or, for example, 300 Pico-seconds) to translate a virtual address to a corresponding physical address. In contrast, the translation module 6 takes relatively less time (e.g., one clock cycle, 30 Pico-seconds, etc.) to translate a virtual address to a corresponding physical address, based at least in part on predicting a descriptor for the virtual address using the prediction module 14. This is because, while the TLB module 10 receives a virtual address and performs a comparison of the virtual address with the TLB entries 20a, ..., 20P, the prediction module 14 generates a corresponding predicted descriptor for the virtual address and outputs the corresponding physical address. Such generation of the predicted descriptor and the corresponding physical address, in an embodiment, may be performed concurrently or even prior to the TLB module 10 receiving and/or comparing the current virtual address with virtual addresses stored in the TLB entries 20a, ..., 20P.

If the translation signal is high, it implies that, although the prediction of the descriptor corresponding to the current virtual address is wrong, the current virtual address is a TLB hit. In such a scenario, although not illustrated in any of the figures, the correct descriptor is accessed directly from the TLB module 10 to generate the correct physical address (instead of using the incorrectly predicted descriptor, and correspondingly incorrectly generated physical address). Such a scenario results in a loss of, for example, one cycle of execution time (e.g., loss of one cycle of execution time compared to a situation where a translation, by the translation module 6, is successful).

In the case the TLB hit verification signal is low (i.e., the current virtual address is a TLB miss), irrespective of the prediction correct signal (or the prediction verification signal, as in such a case the prediction correct signal and the prediction verification signal will anyway indicate incorrect prediction), the correct descriptor is fetched from an appropriate external source (e.g., an external TLB module and/or an external database). Such a scenario also results in a loss of, for example, one or more cycles of execution time. That is, an unsuccessful translation by the translation module 6 results in a loss of one or more cycles of execution time compared to a situation where a translation is successful.

In the case where a prediction by the prediction module 14 is wrong and the current virtual address is a miss in the TLB module 10, there is no performance penalty for using the prediction module 14 (as, in such a case, the translation module has to anyway fetch the correct descriptor from, for example, an external TLB module). In the case where a prediction by the prediction module 14 is wrong and the current virtual address is a hit in the TLB module 10 (i.e., if the translation signal is high), then there is a performance penalty of one cycle for using the prediction module 14. However, in an embodiment, the savings in translation time as a result of correctly predicting the descriptor for most virtual addresses may far out weight the performance penalty resulting from such occasional wrong prediction.

Referring again to FIG. 2, as an example, the physical addresses PA1, ..., PAN generated by the translation module 6 are used by a cache memory 4 (also referred to as cache 4). In an embodiment, the cache 4 is included in the SOC 1 of FIG. 1, while in another embodiment the cache 4 is external to the SOC 1. Although the cache 4 is illustrated to be using the physical addresses generated by the translation module 6, in various other embodiments, any other appropriate type of storage unit (e.g., a hard drive, a random access memory, and/or the like) may use the physical addresses generated by the translation module 6.

The cache 4 includes a cache data/instruction array 168 to store or cache data and/or instructions (although in an embodiment, there may be a cache array for storing data and a separate cache array for storing instructions). The cache 4 also includes a cache tag array 160 and a tag comparison module 164. The cache tag array 160 stores physical addresses of data and/or instructions currently stored in each cache line of the cache data/instruction array 168. The values stored in the cache tag array 160 determine whether a cache lookup results in a cache hit or a cache miss.

Based on receiving a physical address (e.g., PAg) from the translation module, the cache comparison module 164 compares the received physical address PAg with addresses stored in the cache tag array 160. In the case where the physical address PAg matches with an address stored in the cache tag array 160, the physical address PAg is a cache hit, and the associated data and/or instruction is read from the cache data/instruction array 168 through the multiplexer 172 (illustrated as Mux 172 in FIG. 2). On the other hand, if the physical address PAg does not match with any of the addresses stored in the cache tag array 160, the physical address PAg is a cache miss, which results in fetching the associated data and/or instruction from an external memory (not illustrated in FIG. 2) and/or caching the associated data and/or instruction in the cache data/instruction array 168 for future use.

Referring again to FIGS. 1 and 2, in an embodiment, the prediction module 14 predicts the descriptor for the current virtual address using any appropriate type of prediction algorithm. For example, the prediction module 14 looks for pattern(s) in descriptors of past virtual addresses, based on which the prediction module 14 predicts a descriptor of a current virtual address.

Virtual addresses (and associated physical addresses) usually point to storage cells of a storage location that stores data and/or instructions. For example, one or more virtual addresses received by the translation module 6 may have associated physical addresses that point to cache lines in the cache data/instruction array 168. In an embodiment, based on analyzing past descriptors, the prediction module 14 learns, for example, that a single instruction, or a set of instructions, are being repeatedly fetched from the cache 4. Moreover, a virtual address (and a corresponding physical address) can be associated with a page in the cache that stores the single instruction, or the set of instructions. In such a case, the prediction module 14 simply predicts a descriptor of the current virtual address (e.g., VAi) to be same as a descriptor of the past virtual address (e.g., V(i−1)) that was received immediately prior to receiving the current virtual address.

In other embodiments, the predictor module 14 predicts a descriptor of current virtual addresses by analyzing any other appropriate pattern(s) in the descriptors of the past virtual addresses.

In a computing system (e.g., in the SOC 1 of FIG. 1), block data transfer and handling is a common operation, where a block of data is read from one storage location, operated upon (e.g., an appropriate calculation is performed on the block data), and stored to another storage location. For example, the block of data is transferred from cache data/instruction array 168 to an external memory (not illustrated in FIGS. 1 and 2), from a set of registers (not illustrated in FIGS. 1 and 2) to the cache data/instruction array 168, from one part of the external memory to another part of the external memory, and/or the like. In such a transfer of the block of data, data is read from a source location, operated upon, and saved in a destination location. For example, if 1 kilobyte (KB) of data is to be transferred, each data transfer operation can transfer 64 bytes of data, as a result of which the 1 KB of data is transferred using 16 data transfer operations. In an embodiment where the data transfer operation is from a cache (e.g., cache 4) to an external memory, each data transfer operation involves loading 64 bytes data from the cache 4 to a set of registers, and saving the 64 bytes data from the set of registers to the external memory. For 1 KB data transfer, such operations are repeated for at least 16 times.

Figure 3:
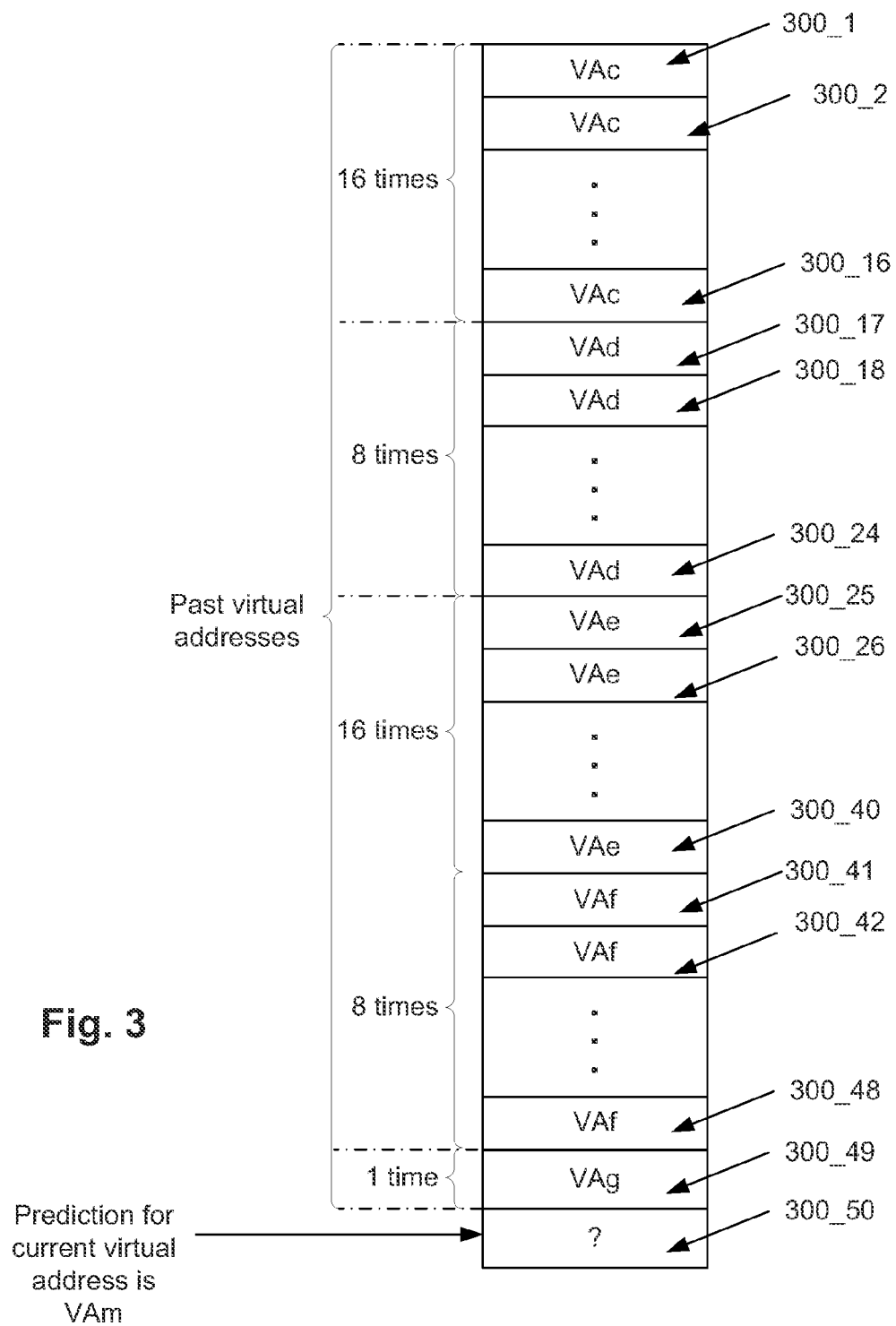
FIG. 3 schematically illustrates an example series of virtual addresses received by the translation module of FIGS. 1 and 2.

FIG. 3 schematically illustrates an example series of virtual addresses 300_1, 300_2, ..., 300_50 received by the translation module 6 of FIGS. 1 and 2. In FIG. 3, the first 16 virtual addresses (labeled as 300_1, ..., 300_16) received by the translation module 6 are VAc, the next 8 virtual addresses (labeled as 300_17, ..., 300_24) received by the translation module 6 are VAd, the next 16 virtual addresses (labeled as 300_25, . . . , 300_40) received by the translation module 6 are VAe, the next 8 virtual addresses (labeled as 300_41, . . . , 300_48) received by the translation module 6 are VAf, and the next virtual address (labeled as 300_49) received by the translation module 6 is VAg. In FIG. 3, virtual addresses 300_1, . . . , 300_49 are past virtual addresses, and the virtual address 300_50 is the current virtual address.

As illustrated in FIG. 3, there is a pattern in the past virtual addresses received by the translation module 6. Such a pattern is observed, for example, while transferring block data from one storage location to another. For example, the first 16 virtual addresses 300_1, . . . , 300_16, received by the translation module 6, are associated with loading data from a storage unit to a set of registers; the next 8 virtual addresses 300_17, . . . , 300_24, received by the translation module 6, are associated with storing data from the set of registers to another storage unit, and so on.

In an embodiment, the prediction module 14 detects such a pattern in the descriptors of the past virtual addresses, and predicts a descriptor of the current virtual address. For example, based on the pattern illustrated in FIG. 3, there is a high probability that the current virtual address (i.e., virtual address 300_50) is VAg. Accordingly, for the current virtual address, the prediction module 14 predicts a descriptor corresponding to virtual address VAg. Also, for the next 14 virtual addresses (e.g., 300_51, . . . , 300_64, not illustrated in FIG. 3) received by the translation module 6, the prediction module 14 predicts a descriptor corresponding to virtual address VAg, and so on.

Although not illustrated in FIG. 3, in an embodiment, the prediction module 14 includes one or more buffers to store data associated with keeping a count of previous virtual addresses, their associated descriptors and/or detecting pattern(s) in past virtual addresses.

The virtual address pattern in FIG. 3 is only an example, and is not limiting on an operation of the prediction module 14. In various embodiments, the prediction module 14 may predict a descriptor for a current virtual address using any other appropriate prediction method using, for example, any other appropriate pattern(s) in past virtual addresses.

Figure 4:
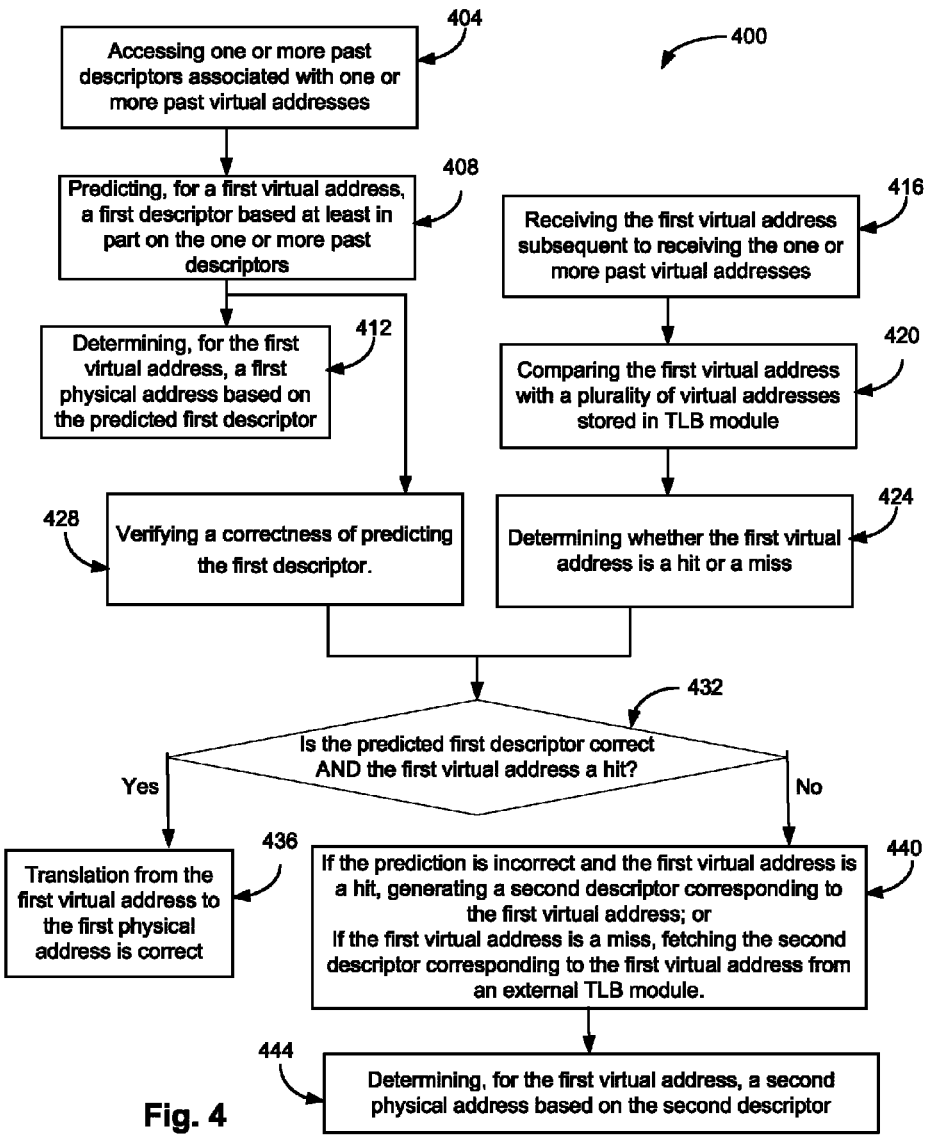
FIG. 4 illustrates an example method for operating the translation module of FIGS. 1 and 2, in accordance with an embodiment of the present disclosure.

FIG. 4 illustrates a method 400 for operating the translation module 6 of FIGS. 1 and 2, in accordance with an embodiment of the present disclosure. The method 400 includes, at 404, accessing (e.g., by the prediction module 14) one or more past descriptors associated with one or more past virtual addresses. The one or more past descriptors are predicted by the prediction module 14 and/or received from the TLB module 10. In an embodiment, the one or more past virtual addresses are received by the translation module 6 prior to receiving a first virtual address (which is the current virtual address).

At 408, the prediction module 14 predicts, for the first virtual address, a first descriptor based at least in part on the one or more past descriptors.

At 412, the multiplexer 34 determines, for the first virtual address, a first physical address based on the predicted first descriptor. For example, the multiplexer 34 receives the first virtual address and also receives the first descriptor. Based at least in part on receiving the first virtual address and the first descriptor, the multiplexer 34 generates the first physical address. In an embodiment, the first physical address is generated by multiplexing one or more bits of the first virtual address and one or more bits of the first descriptor, based at least in part on one or more other bits of the first descriptor.

At 428, the prediction verification module 24 verifies a correctness of predicting the first descriptor. In an embodiment, the determination operation at block 412 may be performed prior to, at least partially concurrently, or subsequent to the verification operation at block 428.

Also, at 416, the TLB module 10 receives the first virtual address. The first virtual address is received subsequent to receiving the one or more past virtual addresses.

At 420, the comparator module 22 compares the first virtual address with a plurality of virtual addresses stored in TLB module (e.g., stored in the TLB entries 20a, . . . , 20P). At 424, the TLB hit verification module 26 determines whether the first virtual address is a hit or a miss. For example, if the first virtual address matches with a virtual address stored in any one of the TLB entries 20a, . . . , 20P, the first virtual address is TLB hit. On the other hand, if the first virtual address does not match with any of the virtual addresses stored in the TLB entries 20a, . . . , 20P, the first virtual address is a TLB miss.

In an embodiment, operations at blocks 416, 420 and/or 424 are performed prior to, at least partially concurrently, or subsequent to the operations at blocks 404, 408, 412 and/or 428. In an embodiment, the prediction operation at block 408 is independent of the compare operation at 420, as previously discussed.

Referring again to FIG. 4, at 432, the prediction correct signal indicates if the predicted first descriptor is correct, and the TLB hit verification signal indicates if the first virtual address is a hit. For example, if Yes at 432, then at 436, translation from the first virtual address to the first physical address is correct.

On the other hand, at 440, if the prediction is incorrect and the first virtual address is a hit (i.e., if the translation signal is high), the TLB module 10 generates a second descriptor corresponding to the first virtual address, and the translation module 6 uses the second descriptor to generate the correct physical address for the first virtual address. Also, at 440, if the first virtual address is a miss (i.e., if the TLB hit verification signal is low), the TLB module 10 fetches the second descriptor corresponding to the first virtual address from an external TLB module (e.g., external to the translation module 6, and possibly external to the SOC 1). At 444, the multiplexer 34 generates a second physical address for the first virtual address, based on the second descriptor, where the second physical address is a correct translation of the first virtual address.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A method for operating a translation module, the method comprising:
   predicting at a prediction module included in the translation module, for a first virtual address, a first descriptor based at least in part on the one or more past descriptors associated with one or more past virtual addresses, wherein predicting the first descriptor further comprises:
   without the prediction module receiving the first virtual address, predicting at the prediction module, for the first virtual address, the first descriptor;
   verifying a correctness of the predicted first descriptor; and based at least in part on the predicted first descriptor, determining, for the first virtual address, a first physical address such that the determination of the first physical address is independent of verifying the correctness of the predicted first descriptor, wherein a critical processing operation for determining the first physical address comprises predicting the first descriptor, and wherein the critical processing operation excludes verifying the correctness of the predicted first descriptor.

2. The method of claim 1, further comprising:

receiving the first virtual address subsequent to receiving the one or more past virtual addresses;

comparing the first virtual address with a plurality of virtual addresses stored in a translation look-aside buffer (TLB) module;

in response to said comparing, if the first virtual address matches with one of the plurality of virtual addresses, determining that the first virtual address is a TLB hit; and in response to said comparing, if the first virtual address does not match with any one of the plurality of virtual addresses, determining that the first virtual address is a TLB miss.

3. The method of claim 2, wherein said predicting the first descriptor further comprises:

predicting the first descriptor such that the prediction is independent of said comparing the first virtual address with the plurality of virtual addresses.

4. The method of claim 2, wherein determining the first physical address further comprises:

irrespective of verifying whether the first descriptor is correctly predicted, determining, for the first virtual address, the first physical address based at least in part on the predicted first descriptor.

5. The method of claim 2, further comprising:

if the first virtual address is a TLB hit and if the first descriptor is correctly predicted, determining that the first physical address is a correct translation of the first virtual address.

6. The method of claim 2, further comprising:

if the first virtual address is a TLB hit and if the first descriptor is incorrectly predicted, generating, for the first virtual address, a second descriptor based at least in part on matching the first virtual address with one of the plurality of virtual addresses.

7. The method of claim 2, further comprising:

if the first virtual address is a TLB miss, fetching, from an external TLB module, a second descriptor associated with the first virtual address.

8. The method of claim 1, wherein said predicting the first descriptor further comprises:

detecting a pattern in the one or more past descriptors; and predicting the first descriptor based at least in part on the detected pattern.

9. The method of claim 1, wherein the one or more past descriptors comprise a plurality of past descriptors, wherein the one or more past virtual addresses comprise a plurality of past virtual addresses, and wherein accessing the plurality of past descriptors further comprises:

predicting at least one of the plurality of past descriptors associated with at least one of the plurality of past virtual addresses; and receiving at least another of the plurality of past descriptors, associated with at least another of the plurality of past virtual addresses, from a translation look-aside buffer (TLB) module.

10. The method of claim 1, wherein determining, for the first virtual address, the first physical address further comprises:

based at least in part on the predicted first descriptor, determining, for the first virtual address, the first physical address, irrespective of whether the first descriptor is correctly predicted or incorrectly predicted.

11. A system-on-chip (SOC) comprising:

one or more processing cores; and a virtual address to physical address translation module comprising:

a prediction module configured to:

predict, for a first virtual address, a first descriptor based at least in part on the one or more past descriptors associated with one or more past virtual addresses, wherein the prediction of the first descriptor is performed (i) without the prediction module receiving the first virtual address and (ii) independent of verifying a correctness of the predicted first descriptor; and a multiplexing module configured to determine, for the first virtual address, a first physical address based at least in part on the predicted first descriptor, wherein a critical processing operation for determining the first physical address comprises predicting the first descriptor, and wherein the critical processing operation excludes verifying the correctness of the predicted first descriptor.

12. The SOC of claim 11, wherein the virtual address to physical address translation module further comprises:

a translation look-aside buffer (TLB) module configured to receive the first virtual address and the one or more past virtual addresses, wherein the one or more past virtual addresses are received prior to receiving the first virtual address.

13. The SOC of claim 11, wherein:

the TLB module further comprises a plurality of TLB entries, wherein each TLB entry stores mapping between at least one virtual address and a corresponding descriptor; and the TLB module is further configured to compare the first virtual address with a plurality of virtual addresses stored in the plurality of TLB entries, in response to said comparing, if the first virtual address matches with one of the plurality of virtual addresses, determine that the first virtual address is a TLB hit, and in response to said comparing, if the first virtual address does not match with any one of the plurality of virtual addresses, determine that the first virtual address is a TLB miss.

14. The SOC of claim 13, wherein:

the TLB module comprises P number of TLB entries, where P is an integer;

the TLB module is configured to output P single-bit signals corresponding to the P number of TLB entries;

if the first virtual address matches with a virtual address stored in one of the P number of TLB entries, the corresponding signal of the P single-bit signals is high and the remaining signals of the P single-bit signals are low; and if the first virtual address does not match with any virtual addresses stored in any of the P number of TLB entries, all signals of the P single-bit signals are low.

15. The SOC of claim 14, further comprising:

a TLB hit verification module configured to receive the P single bit signals and to output a TLB hit verification signal, wherein the TLB hit verification signal indicates whether the first virtual address is a TLB hit or a TLB miss.

16. The SOC of claim 15, further comprising:
a prediction verification module configured to receive (i) the P single bit signals and (ii) a signal from the prediction module that is associated with the first descriptor, and generate a prediction correct signal that is indicative of a correctness of the prediction of the first descriptor.

17. The SOC of claim 16, further comprising:
an inverter to invert the prediction correct signal to generate a prediction verification signal;
a logical AND gate configured to perform a logical AND operation of the prediction verification signal and the TLB hit verification signal, and output a translation signal, wherein the translation signal is high if the first virtual address is a TLB hit and if the prediction of the first descriptor is incorrect.

18. The SOC of claim 15, wherein a critical processing path for determining the first physical address comprises the prediction module, and wherein the critical processing path excludes the prediction verification module.

19. A virtual address to physical address translation module comprising:
a prediction module configured to:
obtain one or more past descriptors associated with one or more past virtual addresses, and
predict, for a first virtual address, a first descriptor based at least in part on the one or more past descriptors, such that (i) the prediction of the first descriptor is performed without the prediction module receiving the first virtual address, and (ii) the prediction of the first descriptor is independent of verifying a correctness of the predicted first descriptor;
a prediction verification module configured to verify a correctness of the predicted first descriptor; and
a multiplexing module configured to determine, for the first virtual address, a first physical address based at least in part on the predicted first descriptor,
wherein a critical processing operation for determining the first physical address comprises predicting the first descriptor, and
wherein the critical processing operation excludes verifying the correctness of the predicted first descriptor.

20. The virtual address to physical address translation module of claim 19, further comprising:
a translation look-aside buffer (TLB) module comprising a plurality of TLB entries, wherein each TLB stores mapping between at least one virtual address and a corresponding descriptor, wherein the TLB module is configured to
compare the first virtual address with a plurality of virtual addresses stored in the plurality of TLB entries,
in response to said comparing, if the first virtual address matches with one of the plurality of virtual addresses, determine that the first virtual address is a TLB hit, and
in response to said comparing, if the first virtual address does not match with any one of the plurality of virtual addresses, determine that the first virtual address is a TLB miss.

21. The virtual address to physical address translation module of claim 19, wherein the first physical address is used for accessing a memory cache.

* * * * *